Patented July 22, 1952

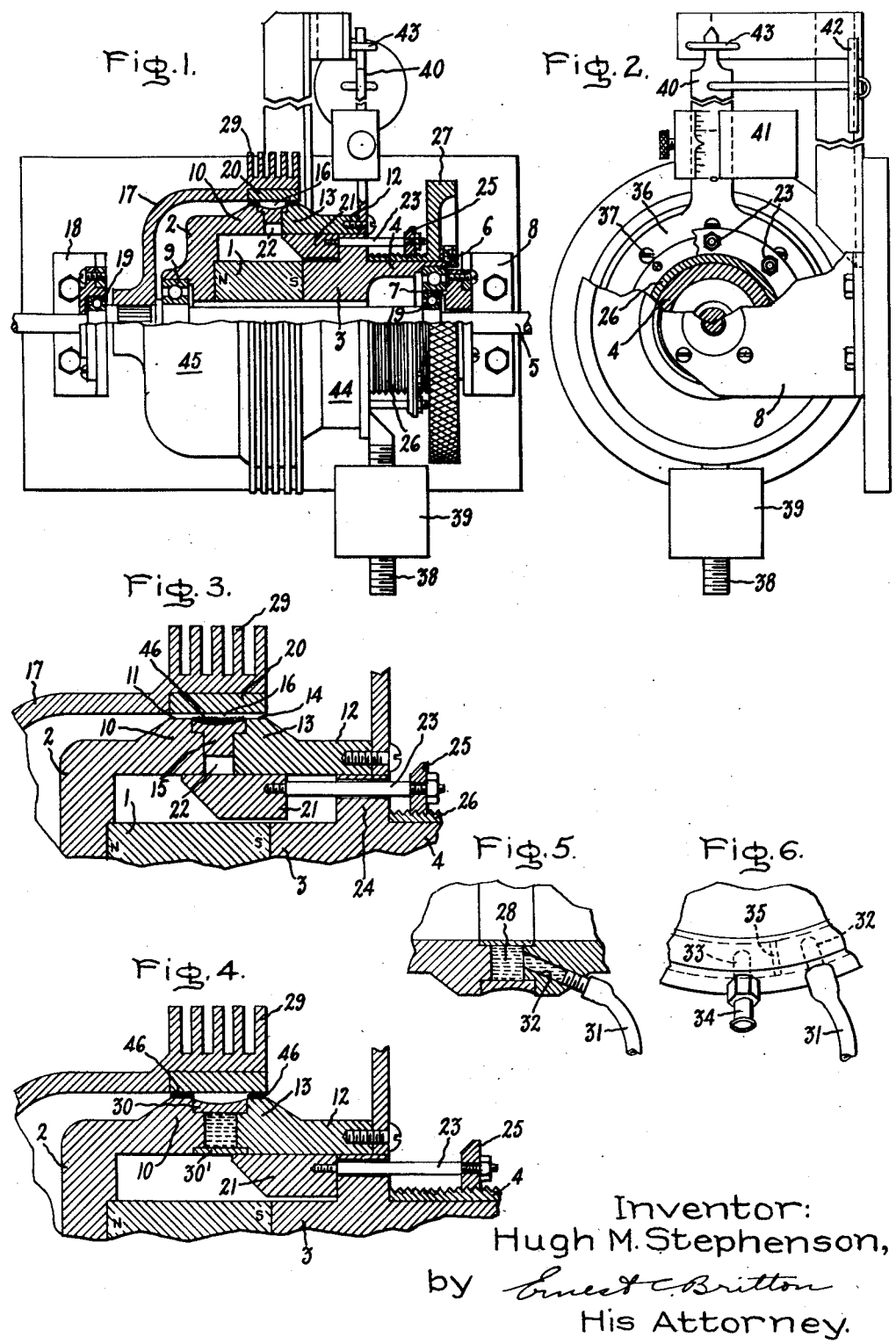

2,604,198

UNITED STATES PATENT OFFICE 2,604,198

MAGNETIC DYNAMOMETER

Hugh M. Stephenson, Fort Wayne, Ind., assignor to General Electric Company, a corporation of New York Application June 2, 1950, Serial No. 165,619

7 Claims. (Cl. 192—21.5)

My invention relates to dynamoelectric machines and particularly to magnetic fluid types of machines which are adapted to be used as clutches, dynamometers, and brakes.

When the space between adjacent surfaces of two magnetic elements is filled with finely divided material and a magnetic field is established between the two surfaces, the magnetic particles bind the two elements together against movement parallel to the surfaces. These magnetic particles may be finely divided iron, and preferably these particles are mixed with oil to prevent packing and to afford a smoother operation. When this iron-oil mixture is placed under the influence of a magnetic field, the iron particles are mutually attracted, and the mixture seemingly "hardens" or "solidifies." The amount of "hardening" is proportional to the applied field and therefore the amount of coupling of the two elements is determined by the strength of the magnetic field. The coupling varies very smoothly from a minimum, which is determined by the viscous drag of the oil, to the maximum which is controlled by the magnetic saturation of the iron-oil mixture. Since only a small amount of electrical energy will effect magnetic saturation, a small magnetic potential is adequate to obtain maximum coupling.

An object of my invention is to provide an improved dynamoelectric machine of the magnetic fluid type.

Another object of my invention is to provide an improved magnetic fluid type dynamoelectric machine wherein a magnetic fluid transmits mechanical movement or force in response to an electromagnetic field.

A further object of my invention is to provide an improved dynamoelectric machine of magnetic fluid type in which the mechanical coupling of the relatively rotatable members of the dynamoelectric machine is obtained by passing a magnetic field through a magnetically susceptible mixture between these members and the coupling is varied by providing an alternate path for the field which is of variable reluctance so that any desired portion of the field will bypass the magnetic fluid.

A still further object of my invention is to provide an improved dynamometer of the magnetic fluid type having fluid cooling means.

Further objects and advantages of my invention will become apparent and my invention will be better understood from the following description referring to the accompanying drawing, and the features of novelty will be pointed out with particularity in the claims annexed to and forming part of this specification.

In the drawing, Fig. 1 is a top view, partly in section, of a dynamoelectric machine, particularly adapted to be used as a dynamometer, which is provided with an embodiment of my improved construction; Fig. 2 is an end view of Fig. 1, partly broken away; Fig. 3 is an enlarged fragmentary sectional view showing a magnetic by-pass member in a position where it permits free rotation between the relatively rotatable members; Fig. 4 is an enlarged fragmentary sectional view of a modification of my invention showing a liquid cooling chamber for the machine and also showing a magnetic by-pass member in a position where maximum force is transmitted between the relatively rotatable members of the dynamoelectric machine; Fig. 5 is an enlarged fragmentary sectional view showing details of connecting the cooling chamber to a source of liquid; and Fig. 6 is an enlarged fragmentary end view showing liquid connections and a dividing wall between the inlet and outlet connections.

A feature of this invention is the provision of an adjustable magnetic shunt to vary the degree of coupling of the relatively rotatable members of a magnetic fluid type dynamometer. A mixture which is capable of transmitting force when placed under the influence of a magnetic field is placed between the relatively rotatable members. One of these relatively rotatable members carries a permanent magnet which is provided with pole pieces having adjacent portions which are separated by a gap to form an interruption in the magnetic circuit of the permanent magnet. The second of the relatively rotatable members has a portion of magnetic material adjacent this interruption in the magnetic circuit. This element provides a flux path bridging this interruption in the magnetic circuit. The flux flowing through this path acts upon the magnetic mixture to cause the mixture to produce a coupling of the rotatable members. A shunt of magnetic material provides an alternate path for the magnetic flux across the interruption in the magnetic circuit. The flux flowing through this alternate path by-passes the magnetic mixture and hence does not cause the mixture to couple the rotatable members together. This shunt is adjustable so that the reluctance of this alternate path may be varied to carry any proportion of the total flux output of the permanent magnet. This permits a smooth continuous adjustment of the machine to absorb any desired torque. Another feature of my invention is the provision of a chamber for cooling liquid in the gap between the two pole pieces.

Referring to the drawing, I have shown in Figs. 1 to 3, inclusive, one embodiment of my invention applied to a dynamoelectric machine construction in which a machine of the fluid clutch type is constructed to be used preferably as a dynamometer or a brake. In this construction, the dynamoelectric machine is provided with a relatively stationary member, indicated generally as 44, having a permanent magnet 1 which is axially polarized. Permanent magnet 1 is ordinarily in the form of an annular ring concentric with the axis of rotation. It is obvious that permanent magnet 1 could be replaced by an annular direct current excited coil surrounding an annular magnetizable core. Pole pieces 2 and 3 of magnetic material are provided at the polar extremities of permanent magnet 1. Pole piece 3 is provided with an outwardly extending annular flange 4 surrounding shaft 5. Annular flange 4 provides a housing for bearing 6 which is carried on a sleeve 7 of support 8. The other end of the relatively stationary member is rotatively supported by suitable bearings 9 carried by shaft 5.

The relatively rotatable member 45 of the dynanometer is a non-magnetic overhanging bell-shaped member 17 which is rigidly mounted on shaft 5 by any suitable means as, for example, a press fit. Shaft 5 in turn is rotatably supported by bearings 19 in supports 8 and 18. A ring of magnetic material 20, encased in bell-shaped member 17, concentrically envelops and is separated from cylindrical surfaces 11 and 14 by gap 16.

I provide a magnetic circuit for permanent magnet 1. In the arrangement illustrated, the magnetic circuit comprises pole piece 2 which is bell-shaped and partially overlies permanent magnet 1. Pole piece 2 terminates in enlarged portion 10 so as to provide a peripheral cylindrical surface 11. Pole piece 3 is enveloped by inwardly extending sleeve 12 of magnetic material which terminates in an enlarged portion 13 which in turn provides a peripheral cylindrical surface 14. Pole piece 3 and sleeve 12 combine to provide a bell-shaped pole structure which partially overlies permanent magnet 1. Enlarged portions 10 and 13 are axially aligned but spaced apart to provide an interruption 22 of high reluctance in the magnetic circuit of permanent magnet 1. A non-magnetic spacer ring 15 forms a closure between enlarged end portions 10 and 13. The outer peripheral surface of this ring is concave. Magnetic flux passes between enlarged portion 10 of pole piece 2 and enlarged portion 13 of sleeve 12 by passing through magnetic ring 20. In doing this the flux crosses and recrosses the gap 16 where it effects the mixture 46, causing the coupling of members 45 and 44. Said mixture 46 is placed in gap 16, and, under the influence of a magnetic field, becomes "solidified" to variable densities proportional to the applied field. While any magnetically susceptible mixture could be used I prefer to use a mixture of powdered iron and oil.

In order to vary the coupling effect between the two relative rotatable members 45 and 44, a ring 21, of magnetic material, is arranged to slide axially within the inner bore of sleeve 12. In the position of ring 21 shown in Fig. 4, the maximum coupling effect is operative because ring 21 does not bridge any portion of gap 22 so that substantially none of the magnetic flux by-passes the iron-oil mixture and ring 20. With ring 21 in the position shown in Fig. 3, substantially all the magnetic flux will bridge the gap 22 by passing through ring 21. This results in removing substantially all the effect of the magnetic field in "solidifying" the iron-oil mixture and permits free relative rotation between members 45 and 44. It is obvious that positioning ring 21 in intermediate positions will result in various proportions of the magnetic flux in each of the two alternate paths past gap 22. Thus a smooth continuous variation of the coupling of members 44 and 45 may be effected.

For adjusting the ring 21 to the desired position and securing it there, I provide a plurality of rods 23 secured to ring 21, as by threading them into equally spaced holes in ring 21, and extending axially through holes in radial flange 24 of pole piece 3. The outer ends of rods 23 are secured to traveling nut 25 which is in threaded engagement with sleeve portion 26 of adjusting nut 27. Adjusting nut 27 is journaled on flange 4 of pole piece 3. The outer periphery of adjusting nut 27 may be knurled to provide a friction surface. It is apparent that, by turning adjusting nut 27, ring 21 may be positioned at any desired position.

Referring to Fig. 4, I have shown an embodiment of my invention provided with fluid cooling means. I provide liquid cooling chamber 28 in gap 22 in addition to peripheral fins 29 which surround the rotatable member in the plane of the gap 16. Chamber 28 has walls provided by adjacent ends of spaced enlarged end portions of the pole structure. The inner and outer walls of this annular space are provided by concentric rings 30 and 30', which are made of non-magnetic material. As best shown in Figs. 5 and 6, the cooling fluid is adapted to pass from a source (not shown) through connection 31 and bore 32 in enlarged portion 13 of sleeve 12 into chamber 28. After passing around chamber 28, the cooling fluid is discharged through bore 33 and drain 34. External fluid connections are flexible as at 31 so as to minimize restraint on the rotation of the stationary member of the machine. Fluid chamber 28 has a radial dividing wall 35 between the fluid inlet and outlet which assures circulation of all of the fluid throughout the entire length of the chamber.

In order to measure the torque transmitted from the member 45 to member 44, I provide an indicator pointer 36 (see Fig. 2) secured to sleeve 12 of the member 44 by a series of circumferentially spaced screws 37. The pointer 36 has a rearwardly extending arm 38 provided with a counterbalance 39. The forwardly extending arm 40 of the pointer 36 is provided with an adjustable balance weight 41 and a weight table 42. The angular movement of the pointer is limited by stop 43.

In operation, shaft 5 drives member 17. With shunting ring 21 in the position shown in Fig. 1, the magnetic circuit for permanent magnet 1 is completed through gap 16 and ring 20, causing the powdered oil-iron mixture 46 to "solidify" and thereby couple the relatively rotatable members 44 and 45 together. If the torque on shaft 5 exceeds the amount which mixture 46 is capable of transmitting, slippage occurs and member 45 rotates relative to member 44 while a constant torque continues to be transmitted by mixture 46. Because of the oil in the mixture 46, this slippage causes very little wear. To vary the torque transmitted between the two relatively rotatable members 44 and 45, adjusting nut 27 is turned to cause ring 21 to partially by-pass the gap 22 and thereby reduce the amount of flux passing through the powder gap. This results in a lesser "solidifying" effect on the mixture 46 which reduces its coupling effect. If ring 21 completely shunts gap 22, substantially no flux is effective to solidify the powdered iron-oil mixture, and free relative rotation of the members 45 and 46 is permitted. Because of stray flux lines across gap 22, mixture 46 will assume a position as shown in Fig. 3 in the concave face of ring 15.

While I have illustrated and described particular embodiments of my inventions, modifications thereof will occur to those skilled in the art. I desire it to be understood, therefore, that my invention is not limited to the particular arrangements disclosed, and I intend in the appended claims to cover all modifications which do not depart from the spirit and scope of my invention.

What I claim as new and desire to secure by Letters Patent of the United States is:

1. A dynamoelectric machine having a pair of relatively rotatable members, one of said members comprising an axially polarized permanent magnet ring, pole pieces for said ring, each of said pole pieces being bell-shaped and terminating in spaced apart portions having cylindrical peripheral surfaces, the second of said relatively rotatable members comprising a ring of magnetic material surrounding said cylindrical peripheral surfaces to provide a flux path between said spaced apart portions, an adjustable magnetic ring adapted to provide a second flux path between said spaced apart portions, and a magnetically susceptible mixture in the space between said cylindrical peripheral surfaces and said surrounding ring.

2. A dynamoelectric machine having relatively rotatable members one of said members having a permanent magnet ring, pole structure for said magnet ring, said pole structure comprising two inwardly turned bell-shaped pole pieces having spaced apart aligned portions, the second of said relatively rotatable members comprising a ring of magnetic material arranged in closely spaced relationship with said spaced apart portions to provide a flux path between said spaced apart portions, a powdered iron-oil mixture between said spaced apart portions of the first-mentioned relatively rotatable member and said magnetic ring of the second-mentioned relatively rotatable member, and a second magnetic ring adapted to provide a second flux path between said spaced apart portions of said pole pieces, adjusting means for said second magnetic ring, said adjusting means comprising a sleeve journaled on one of said pole pieces and means secured to said second magnetic ring controlled by said sleeve for changing the position of said second magnetic ring.

3. A dynamoelectric machine having a relatively stationary member and a relatively rotatable member, said relatively stationary member having an axially polarized permanent magnet, ring-shaped pole pieces for said magnet, each of said pole pieces having an inwardly turned portion, a non-magnetic ring secured between said inwardly turned portions, said relatively rotatable member comprising a bell-shaped member of non-magnetic material, said bell-shaped member encasing a ring of magnetic material arranged in closely spaced relationship surrounding said inwardly turned portions to provide a flux path across said non-magnetic spacer ring, a mixture in the space between said inwardly turned portions and the surrounding ring of magnetic material adapted to increase in viscosity when placed under the influence of electromagnetic flux, and an adjustable magnetic ring adapted to provide a second flux path across the non-magnetic spacer ring by-passing said mixture.

4. A dynamoelectric machine having an inner relatively stationary member and an outer relatively rotatable member, said inner member comprising an axially polarized permanent magnet, bell-shaped pole pieces terminating in aligned spaced apart portions having cylindrical outer surfaces, and an adjustable magnetic ring within the bore of said pole pieces, said magnetic ring being adapted to provide a flux path of variable reluctance between said spaced apart portions of the pole pieces, and means for adjusting the position of said adjustable magnetic ring, said outer member comprising a ring of magnetic material surrounding said cylindrical outer surfaces of said pole pieces to provide a second path for the flux of said permanent magnet, and a magnetically susceptible mixture in the space between said cylindrical outer surfaces of the pole pieces and said ring on said outer member.

5. A dynamoelectric machine having a relatively stationary and a relatively rotatable member, said relatively stationary member comprising a permanent magnet having inwardly turned bell-shaped pole pieces, the adjacent ends of said inwardly turned portions of the pole pieces being arranged in closely spaced relationship, means forming a fluid chamber between said spaced apart portions, said relatively rotatable member comprising a ring of magnetic material surrounding said spaced apart portions, and a magnetically susceptible mixture in the gap between the spaced apart portions and the surrounding ring of magnetic material on said relatively rotatable member.

6. A dynamoelectric machine having relatively rotatable members, one of said members comprising a permanent magnet having bell-shaped pole pieces, the inwardly turned portions of said pole pieces being aligned and spaced apart, means including walls of non-magnetic material between said spaced apart portions to provide a fluid cooling chamber, the second of said members comprising a ring of magnetic material surrounding said spaced apart portions and a magnetically susceptible mixture in the space between the ring of the second of said relatively rotatable members and said spaced apart portions of the first of said relatively rotatable members.

7. A dynamoelectric machine having a relatively stationary member and a relatively rotatable member, said relatively stationary member having an axially polarized permanent magnet, bell-shaped pole pieces for said magnet, said bell-shaped pole pieces terminating in aligned spaced apart portions having cylindrical outer surfaces, concentric walls of non-magnetic material between said spaced apart portions to provide an annular fluid cooling chamber, and an adjustable magnetic ring within the bore of said pole pieces, said magnetic ring being adapted to provide a flux path of variable reluctance across said fluid cooling chamber, said rotatable member comprising a ring of magnetic material surrounding said cylindrical outer surfaces to provide a second path for the flux of said permanent magnet, and a magnetically susceptible mixture in the space between said cylindrical outer surfaces of the pole pieces and said ring on said rotatable member.

HUGH M. STEPHENSON.

REFERENCES CITED

The following references are of record in the file of this patent:

UNITED STATES PATENTS

| Number | Name | Date |
|---|---|---|
| 555,068 | Biddle | Feb. 25, 1896 |
| 936,503 | Williams | Oct. 12, 1909 |
| 2,575,360 | Rabinow | Nov. 20, 1951 |

FOREIGN PATENTS

| Number | Country | Date |
|---|---|---|
| 446,255 | Great Britain | July 24, 1934 |
| 562,622 | Great Britain | July 10, 1944 |
| 485,591 | Belgium | Nov. 13, 1948 |

OTHER REFERENCES

Technical Report 1213, National Bureau of Standards, Washington, D. C.; copy received in Division 68 U. S. Patent Office on March 30, 1948.